US008892934B2

United States Patent
Götz et al.

(10) Patent No.: US 8,892,934 B2
(45) Date of Patent: Nov. 18, 2014

(54) METHOD FOR INTEGRATION OF SYSTEMS WITH ONLY ONE SYNC DOMAIN FOR TIME OF DAY AND CLOCK PULSE SYNCHRONIZATION INTO A GLOBAL TIME OF DAY SYNCHRONIZATION DOMAIN

(75) Inventors: Franz-Josef Götz, Heideck (DE); Günter Steindl, Poppenricht (DE)

(73) Assignee: Siemens Aktiengesellschaft, Munich (DE)

( * ) Notice: Subject to any disclaimer, the term of this patent is extended or adjusted under 35 U.S.C. 154(b) by 246 days.

(21) Appl. No.: 13/542,519

(22) Filed: Jul. 5, 2012

(65) Prior Publication Data
US 2013/0013952 A1 Jan. 10, 2013

(30) Foreign Application Priority Data
Jul. 8, 2011 (EP) .................................. 11173299

(51) Int. Cl.
*G06F 1/12* (2006.01)
*G04G 7/00* (2006.01)
*H04J 3/06* (2006.01)

(52) U.S. Cl.
CPC ................. *G04G 7/00* (2013.01); *H04J 3/0664* (2013.01); *H04J 3/0638* (2013.01)
USPC .......................................... 713/400; 375/356

(58) Field of Classification Search
CPC ............ G06F 1/12; G06G 7/00; H04J 3/0638
USPC .......................................... 375/356; 713/400
See application file for complete search history.

(56) References Cited

U.S. PATENT DOCUMENTS 7,801,258 B2 * 9/2010 Narus et al. .................... 375/356
8,307,235 B2 * 11/2012 Patel et al. .................... 713/400

FOREIGN PATENT DOCUMENTS

DE          103 45 231       6/2004
DE       10 2005 039771     12/2006

OTHER PUBLICATIONS

Rehnmann M et al: "Synchronization in a force measurement system using EtherCAT", Emerging Technologies and Factory Automation, 2008, ETFA 2008, IEEE International Conference on, IEEE, Piscataway, NJ, USA, Sep. 15, 2008, pp. 1023-1030, XP031344736, ISBN: 978-1-4244-1505-2, p. 1025, rechte Spalte, letzte Zelle, p. 1026, links Spalte, Absatz 3, p. 1026, rechte Spalte, Absatz 3, p. 1027, letzter Absatz, Abbildung 4; Others; 2008; US.

(Continued)

*Primary Examiner* — Albert Wang
(74) *Attorney, Agent, or Firm* — Cozen O'Connor

(57) ABSTRACT

A method for synchronizing the operating clock and the timing clock of a subordinate domain of an automation network, wherein sync slaves are synchronized by a clock sync master with respect to an operating clock, a clock sync master forms part of a subordinate domain, a single synchronization message serves to synchronize the sync slaves with respect to their respective operating clock and timing clock, wherein the method comprises providing a notification of the difference between the timing clock and the operating clock using the synchronization message, and accepting this difference into the synchronization message as additional information.

9 Claims, 2 Drawing Sheets

(56) References Cited

OTHER PUBLICATIONS

Jasperneite J et al: "Enhancements to the time synchronization standard IEEE-1588 for a system of cascaded brigdes", Factory Communication Systems, 2004.Proceedings, 2004 IEEE International Workshop on Vienna, Austria Sep. 22-24, 2004, Piscataway, NJ, USA, IEEE, Sep. 22, 2004, pp. 239-244, XP010756406, DOI: 10.1109/WFCS.2004.1377716, ISBN: 978-0-7803-8734-8, Zusammenfassung, p. 241, linke Spalte, Absatz 1—rechte Spalte, Absatz 1; Abbildungen 1,3; Others; 2004; US.

Paolo Ferrari et al: "On the Seamless Interconnection of IEEE1588-Based Devices Using a PROFINET IO Infrastructure", IEEE Transactions on Industrial Informatics, IEEE Service Center, New York, NY, US, Bd. 6, No. 3, Aug. 1, 2010, pp. 381-392, XP011312327, ISSN: 1551-3203, p. 385, linke Spalte, Absatz 2—rechte Spalte, Absatz 3, Abbildungen 3,4,6; Others; 2008; US.

\* cited by examiner ical network. Thus, in addition to the real-time communication protocol, at least one further communication protocol (that

METHOD FOR INTEGRATION OF SYSTEMS WITH ONLY ONE SYNC DOMAIN FOR TIME OF DAY AND CLOCK PULSE SYNCHRONIZATION INTO A GLOBAL TIME OF DAY SYNCHRONIZATION DOMAIN

BACKGROUND OF THE INVENTION

1. Field of the Invention

The invention relates to a method for operating clock and timing clock synchronization of a subordinate domain of an automation network, a method for operating clock and timing clock synchronization of a subordinate domain of an automation network and to a computer program product.

2. Description of the Related Art

Previously for synchronization of components of an automation network with regard to the operating clock and also the timing clock at least two different sync domains were used. The previous prior art with respect to operating clock and also timing clock synchronization of components of the network originates from the standardized network time protocols Internet Engineering Task Force (IETF), Simple Mail Transfer Protocol (SMTP), Institute of Electrical and Electronics Engineers (IEEE) standard 1588 v2, IEEE standard 802.1AS, IETF Request for comment (RFC) "(S)NTP"IEC61158 TYPE 10-PTCP.

Rehnmann, M. and Gentzell, T. "Synchronization in a Force Measurement System Using EtherCAT," Emerging Technologies and Factory Automation, 2008, EFTA 2008, IEEE International Conference on, IEEE, Piscataway, N.J., USA, 15 Sep. 2008 (2008 Sep. 15), Pages 1023-1030XP031344736ISBN: 978-1-4244-1505-2, disclose a method for how master and slaves in a force measurement system can be synchronized using EtherCAT.

Jasperneite J. et al. "Enhancements to the time synchronization standard IEEE-15888 for a System of Cascaded Bridges", Factory Communication Systems, 2004. Proceedings. 2004 IEEE International NAL Workshop in Vienna, Austria Sep. 22-24, 2004,Piscataway, N.J., USA, IEEE, 22. Sep. 2004 (2004 Sep. 22), Pages 239-244, XP010756406, DOI: 10.1109/WFCS.2004.1377716,ISBN: 978-0-7803-8734-8, disclose a method for improving the IEEE-15888 standard method for synchronization of Precision Time Protocol (PTP) slaves using a "bypass clock".

Paolo Ferrara et al., "On the Seamless Interconnection of IEEE 15888-Based Devices Using a PROFINET IO Infrastructure", IEEE TRANSACTIONS ON INDUSTRIAL INFORMATICS, IEEE SERVICE CENTER, New York, N.Y., US, Bd. 6, No. 3, 1. Aug. 2010, Pages 381-392, XP011312327, ISSN: 1551-3203, disclose a method for synchronizing different types of industrial real-time Ethernet networks using a synchronization converter for bypassing a boundary clock.

DE 10 2005 039771 B3 to Halang et al. discloses a unit for management of real-time processes without asynchronous interruptions. DE 103 45 231 A1 discloses a method for coordination of at least one slave control unit with a master control unit.

SUMMARY OF THE INVENTION

It is an object of the present invention to provide an improved method for synchronizing an operating clock with a timing clock of sync slaves of a subordinate domain of an automation network, an improved facility for simultaneous operating clock and timing clock synchronization of sync slaves of a subordinate domain and to also provide an improved computer program product.

These and other objects and advantages are achieved in accordance with the invention by a method for synchronizing the operating clock with the timing clock of a subordinate domain of an automation network, comprising a set of sync slaves to be coordinated in time, where a clock sync master forms part of the subordinate domain, the individual synchronization message is used for synchronizing the sync slaves with respect to their operating clock and timing clock. The method comprises providing a notification of the difference between the timing clock and the operating clock using the synchronization message, where this difference and the synchronization message are accepted as additional information.

Thus, in accordance with the invention the generally-applicable time, such as International atomic time (TAI), is sent by a time sync master of a higher-ranking domain of an automation network to a clock sync master of a subordinate domain of an automation network by a synchronization message. The clock sync master of the subordinate domain of the automation network accepts the time of day or timing clock of the time sync master of the higher-ranking domain and simultaneously determines the difference between the timing clock and the operating clock of the time sync master of the subordinate domain. This difference is integrated as additional information into the synchronization message which is then distributed by the clock sync master to all subordinate sync slaves within the subordinate domain. Each sync slave of the subordinate domain recognizes this additional information with respect to the difference between timing clock and operating clock and calculates its local system time from this additional information.

In theory, any given number of timing clocks or any given number of logical clocks of any type with different times can be synchronized in accordance with the method in a network system consisting of a number of independent subdomains.

An advantage of the disclosed method is in the fact that only one single synchronization message is needed. A further advantage resulting from the simultaneous synchronization of the operating clock and the timing clock by only one single synchronization message is a reduction of the degree of networking and a reduction in the need for additional hardware.

A domain of an automation network is understood to be a group of automation components, in this context referred to as sync slaves, where the operating clock is predetermined and synchronized in time by a higher-ranking clock sync master within the domain of the sync slaves. A time sync master belongs to the global domain lying one hierarchy level higher and, for example, delivers the generally-valid time to the individual clock sync masters of the different subordinate domains.

In on embodiment, an automation network comprises an industrial automation network. Such industrial automation networks that is configured and/or provided, for example, for control and/or regulation of industrial systems (e.g., productions systems or conveyor systems), machines and/or devices. In particular, automation networks or industrial automation networks can have real-time communication protocols (e.g., Profinet, Profibus or Real-Time Ethernet) for communication at least between the components involved in the control and/or regulation tasks, e.g., between the control units and the systems and/or machines to be controlled). The secure transmission of data via storage media is also covered.

Furthermore, in addition to a real-time communication protocol, at least one further communication protocol (that is not required to have real-time capabilities, for example) can be provided in the automation network or industrial automation network, e.g., for monitoring, setting up, reprogramming and/or re-parameterizing one or more control units in the automation network.

In one embodiment, the automation network includes wired communication components and/or wireless communication components. In addition, the automation network can also include at least one automation device.

In embodiments, the automation device comprises a computer, PC and/or controller with control tasks or control capabilities. In preferred embodiments, the automation device comprises an industrial automation device which is configured and/or provided specifically for control and/or regulation of industrial systems. In particular, such automation devices or industrial automation devices can have real-time capabilities, i.e., make control or regulation in real-time possible. To this end, the automation device or the industrial automation device can, for example, comprise a real-time operating system and/or at least include support for a real-time-capable communication protocol for communication (e.g., Profinet, Profibus or Real-Time Ethernet).

In other embodiments, the automation network comprises a number of sensors and actuators that are controlled by at least one control device. The actuators, the sensors and the at least one control device exchange data with one another. An automation protocol is used for exchange of data. The at least one control device controls the actuators, the sensors and the exchange of data so that a mechanical production process executes, in which a product is manufactured, for example.

In accordance with the disclosed embodiments, an industrial automation device comprises a programmable logic controller, a module or part of a programmable logic controller, a programmable logic controller integrated into a computer or PC and also corresponding field devices, sensors and/or actuators, input and/or output devices for connection to a device such as a programmable logic controller.

An automation protocol within the meaning of the disclosed embodiments of the present invention is to be understood as any type of protocol that is provided, suitable and/or configured for communication with automation devices in accordance with the present disclosure. Such automation protocols can, for example, be the PROFIBUS protocol (e.g., in accordance with International Electrotechnical Commission (IEC) standard 61158), a PROFIBUS-DP protocol, a PROFIBUS-PA protocol, a PROFINET protocol, a PROFINET-IO protocol, a protocol in accordance with the AS interface, a protocol in accordance with IO Link, a KNX protocol, a protocol in accordance with a multipoint interface (MPI), a protocol for a point-to-point link (Point-to-Point, PtP), a protocol in accordance with the S7 communication specification (which is provided and configured, for example, for communication between programmable logic controllers manufactured by Siemens) or an Industrial Ethernet protocol or Real-Time-Ethernet protocol or further specific protocols for communication with automation devices. Any given combination of the aforementioned protocols can also be provided as a protocol within the meaning of the disclosed embodiments of the invention.

In accordance with an embodiment of the invention, during an integration of the subordinate domain of an automation network the operating clock of the components of the subordinate domain will be retained unchanged.

The disclosed method is thus applicable during the merge and division of a number of domains without resulting in disruptions of the operating sequence or tedious adaptation processes, with any given number of subordinate domains of an automation network able to be connected both in series and also in parallel.

An advantage of this presently contemplated embodiment of the method thus lies in the fact that the operating clock of each of the components of the domain to be integrated into the automation network runs continuously even during the decoupling without interruption and uninfluenced so that the operation of the automation components is not interrupted during the integration or decoupling process. This implies that the local system times of the sync slaves and the clock sync masters continue to run without discontinuity. Thus each individual automation component can keep running continuously without interrupting production, for example. In addition, there is no creation of artificial dependency on account of different operating clocks in individual independent modules of an automation system.

In accordance with an embodiment of the invention, during an integration of the subordinate domain into the higher-ranking domain, the timing clock of the subordinate domain is synchronized directly with the timing clock of the higher-ranking domain. Consequently, the rate compensation between the generally-valid time of the time sync master of the global domain and the local system time of the clock sync master of the subordinate domain is set to 0. Since the clock sync master thus aligns its timers to the synchronization message, for example, the external international atomic time (TAI), follows it so to speak, all sync slaves follow this international atomic time (TAI), i.e., the local system time of each individual sync slave is identical to the time specified externally by the time sync master. This has the advantage that, for example, time stamps issued for protocols actually use the international atomic time (TAI) as a common reference.

In accordance with another embodiment of the invention, the operating clock and the timing clock are specified by absolute time specifications. The advantage of this is that the oscillation frequencies of the quartz clock intrinsic to each sync slave are represented uniformly and thus comparably, and the operating clock and the timing clock thus have identical dimensions. This also allows the difference between operating clock and timing clock to be better visualized and also calculated in a simpler manner.

In accordance with a further embodiment of the invention, each individual sync slave of the subordinate domain can read out the difference contained in the synchronization message and calculate a local system time from this difference. Each sync slave thus possesses the capability and interface to read and evaluate the specifically configured synchronization message. This means that each individual sync slave is aligned to be synchronized only by an individual synchronization message in respect of the operating clock and also the timing clock. This has the advantage that no further synchronization message or no further SyncFrame respectively is required, the degree of networking is kept to the minimum and no additional hardware components are required.

In accordance with another embodiment of the invention, in a timing clock synchronization between the subordinate domain and a further subordinate domain, the timing clock of the time sync master is calculated from the operating clock and the difference, and the timing clock thus calculated is transmitted without this difference in a further synchronization message to the further subordinate domain. For example, the last sync slave of the subordinate domain by which direct linkage of the further subordinate domain is realized, adds the accumulated difference between timing clock and operating clock to the delay field of the synchronization message and sets the difference between timing clock and operating clock equal to 0. This has the advantage that, for example, on merging a number of domains, a difference-free time, meaning ultimately the generally-valid time which was specified by the time sync master of the global domain, is forwarded to the clock sync master of the next subordinate domain.

In accordance with yet another embodiment of the invention, an adaptation of the frequency of the clock sync master to that of the time sync master occurs so that the clock error between clock sync master and time sync master is minimized. This has the advantage that the local system time of the clock sync master largely matches the externally specified time.

The difference between the timing clocks of the clock sync master and of the time sync master and also between the timing clocks of the individual sync slaves arises because the system-intrinsic quartz clocks of the individual components have different proprietary oscillation frequencies. This results in each case in a clock error in the nanosecond range, i.e., the system clocks of the individual components initially do not run synchronously.

In accordance with a further embodiment of the invention, the synchronization message has the operating clock as its only clock. This has the advantage that the functionality of the synchronization message primarily concentrates on the synchronization of the automation components of one domain of an automation system without being loaded with additional execution commands. The fact that the deviation between the local system time of the sync slaves and the externally specified time is only contained as additional information in the synchronization message means that the primary function of the clock sync master is essentially concentrated on the synchronization of the automation components. For example, this essentially enables the focus of the function of the clock sync master to be set to the continuous operation of a production machine.

It is also an object of the invention to provide a facility for operating clock and timing clock synchronization of a subordinate domain of an automation network, comprising a quantity of sync slaves to be coordinated in time, which are able to be synchronized by a higher-ranking time sync master of a higher-ranking domain with respect to the timing clock, with the sync slaves able to be synchronized by a clock sync master with respect to the operating clock, with the clock sync master being part of the subordinate domain, with the facility comprising a module for notifying a difference between the timing clock and the operating clock using a synchronization message, with the one synchronization message serving to synchronize the sync slaves with respect to their operating clock, with this difference in the synchronization message being included as additional information.

It is also an object of the invention to provide a computer program product including instructions able to be executed by a processor for performing the method in accordance with the disclosed embodiments.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred embodiments of the invention are explained in greater detail below with reference to the following drawings, in which.

DETAILED DESCRIPTION OF THE PREFERRED EMBODIMENTS

Figure 1:
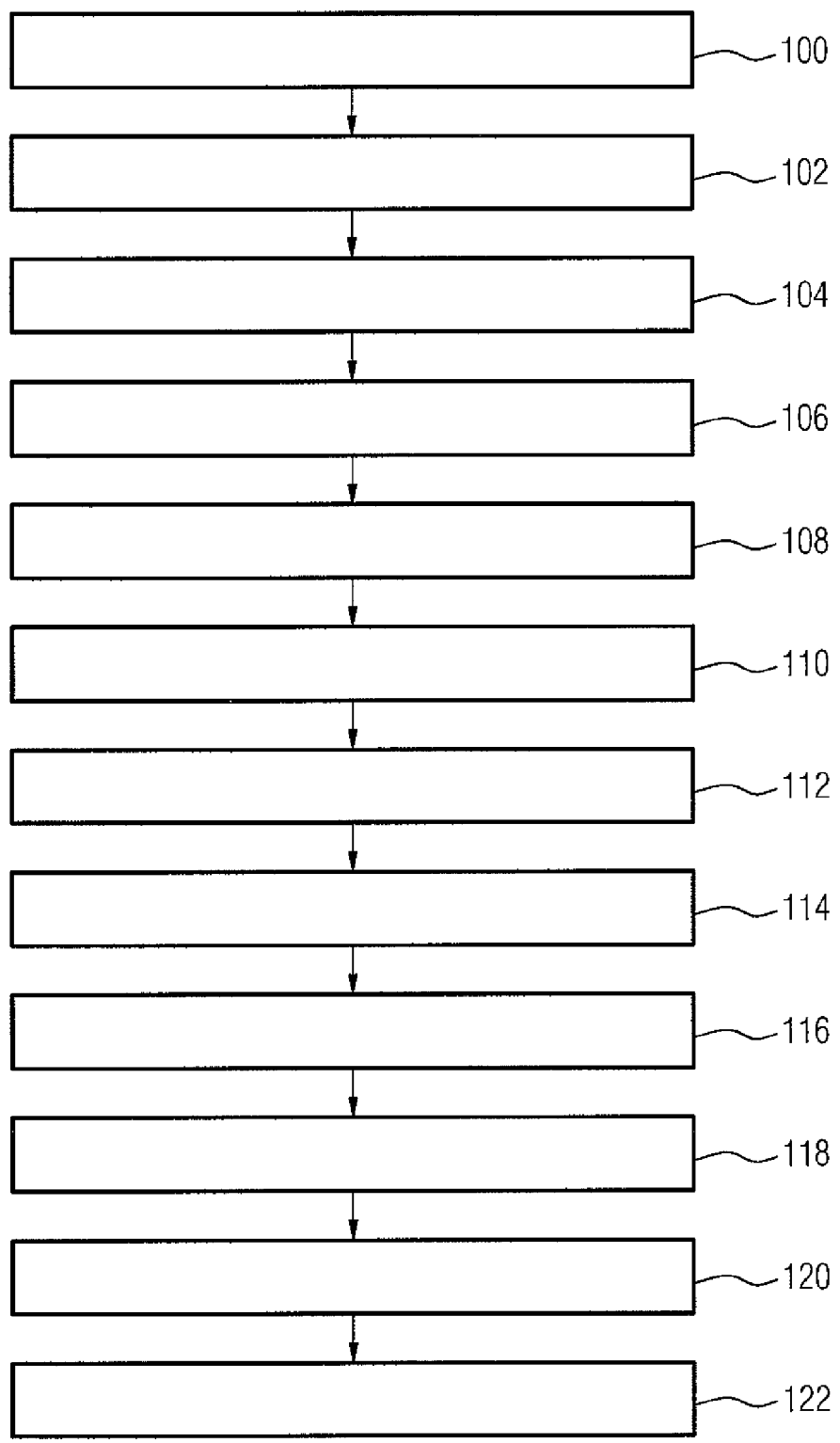
FIG. 1 shows a flow chart of the method in accordance with an embodiment of the invention.

FIG. 1 shows a flow chart of a method for operating clock and timing clock synchronization of a subordinate domain of an automation network. The method begins initially in step 100, with the time sync master of a higher-ranking domain sending a generally-valid time into a clock sync master of a subordinate domain. In step 102, the clock sync master accepts the timing clock of the time sync master, with the clock sync master also simultaneously determining a difference between the externally specified timing clock and the operating clock of the domain.

In step 106, the clock sync master informs a first sync slave about operating clock and difference between timing clock and operating clock by an individual synchronization message. In step 108, the sync slave reads out the operating clock and the difference between timing clock and operating clock from the received synchronization message. From this difference the sync slave calculates its local system time, as indicated in step 110.

In step 112, the sync slave for its part then transfers in a single synchronization message the information about operating clock and difference between timing clock and operating clock to the next sync slave of the domain. In step 114, the synchronization message is passed on to the remaining sync slaves, with each individual sync slave calculating its local system time from the difference.

In step 116, the last sync slave of the subordinate domain adds the accumulated difference between timing clock and operating clock to the delay field of the synchronization message and sets the difference to 0. Thus, in step 118, the timing clock issued externally is free from any difference. For serial linkage of subordinate domains the generally-applicable time is thus forwarded without difference in step 120 from the last sync slave of preceding domain to the clock sync master of the following domain, with once again only a single synchronization message being needed. In this following subordinate domain, the same process is repeated in accordance with step 122—as described above—as has occurred in the preceding domain.

As an alternative or in addition to a serial linkage of subordinate domains, a parallel connection of the subordinate domains is also possible, with the time sync master of the global domain then transferring the time directly to each clock sync master of a subordinate domain without a frequency shift.

Figure 2:
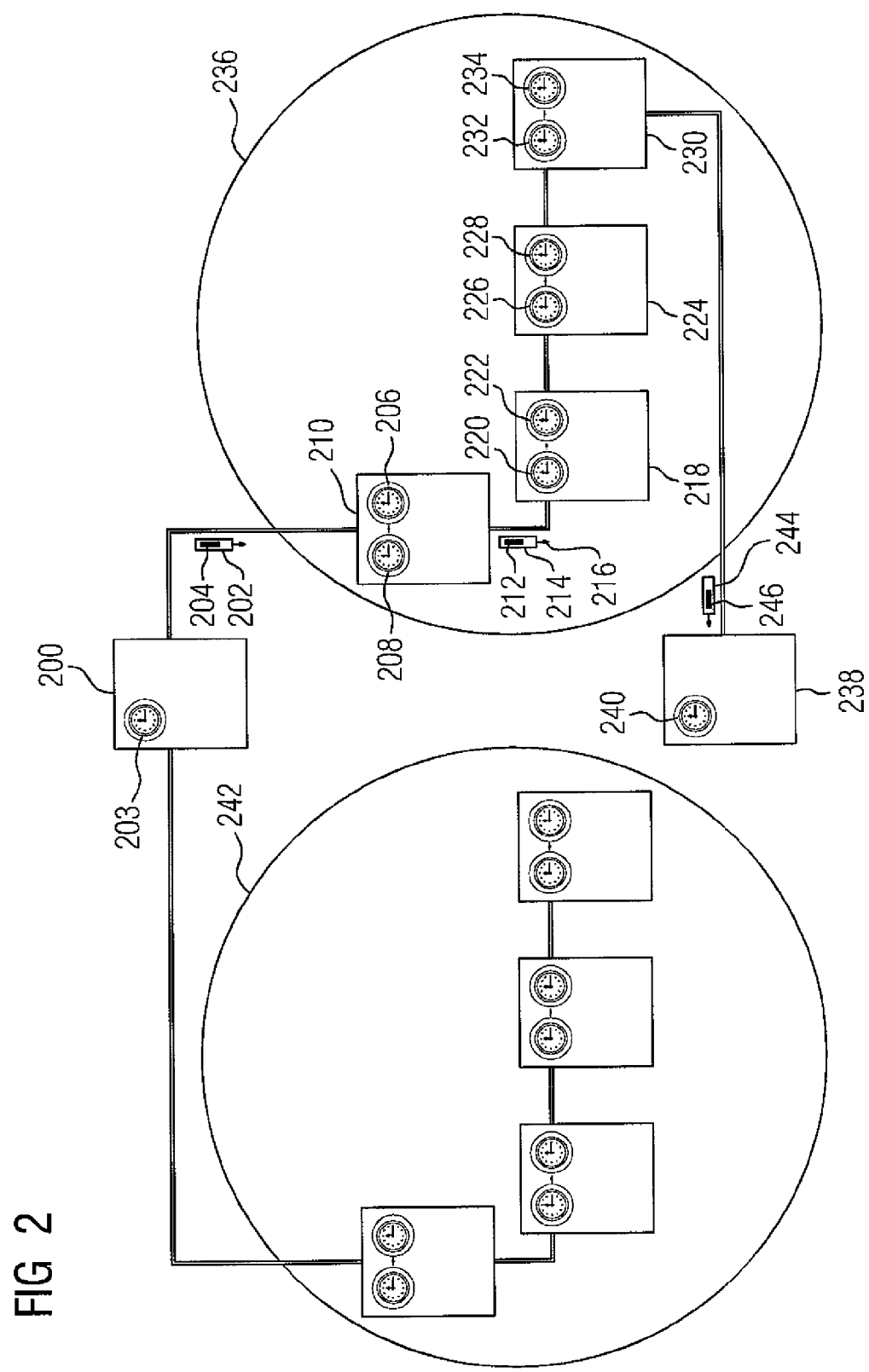
FIG. 2 shows a block diagram to illustrate the method and the system for operating clock and timing clock synchronization of a subordinate domain of an automation network.

FIG. 2 shows a schematic block diagram of a facility for operating clock and timing clock synchronization of two subordinate domains, which are connected in parallel to a higher-ranking time sync master 200 of a global domain. The higher-ranking time sync master 200 of the global domain sends a synchronization message 202, which contains information about a time of day 204 to the clock sync master 206 of the subordinate domain 236, with the clock sync master 206 accepting the time 203 of the higher-ranking time sync master 200 as its own system time 208.

From the difference between the newly set system time 208 and the system-intrinsic operating clock 210, the clock sync master 206 determines the difference between the timing clock and the operating clock. The difference 214 thus determined is forwarded as additional information of the synchronization message 216, which primarily communicates the operating clock to the next sync slave 218.

The sync slave 218 possesses the capability to read out the difference 214 and calculates its local system time 220 from this difference 214. The information delivered in the synchronization message 212 with respect to the operating clock 216 defines the operating clock of the sync slave, which is shown as the system-intrinsic operating clock 222.

The sync slave 218 forwards the synchronization message 212 to the next sync slave 224, which likewise recalculates its local system time 226 from the information supplied with the synchronization message 212 about the difference 214 between operating clock and timing clock. The operating clock delivered with the synchronization message 212 in its turn influences the operating clock of the sync slave 224 which is represented as system-intrinsic operating clock 228. This process repeats and it is ultimately the last sync slave 230 of the network of the domain 236 that receives the synchronization message 212 from the preceding sync slave.

This likewise calculates its local system time 232 from the difference 214 and adapts its operating clock to the operating clock 315 delivered with the synchronization message, which is able to be traced in the system-intrinsic operating clock 234. The last sync slave 230 in the network of domain 236 adds the accumulated differences between operating clock and timing clock into the delay field of the synchronization message 244 leaving the domain which, like the synchronization message 202 initially sent from the higher-ranking time sync master 202, only contains the time of day 246. This synchronization message 244 can then be forwarded either to a time sync slave 238 of the global higher-ranking domain or in another embodiment to the clock sync master of another subordinate domain.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for synchronizing an operating clock of a subordinate domain of an automation network with a timing clock of the subordinate domain of the automation network, the automation network comprising a plurality of sync slaves of the subordinate domain, such that the plurality of sync slaves are coordinated in time, wherein a higher-ranking time sync master of a higher-ranking domain synchronizes each of the plurality of sync slaves of the subordinate domain with respect to the timing clock of the subordinate domain of the automation network, comprising:

sending, from the higher-ranking time sync master, a first synchronization message to a clock sync master of the subordinate domain, the first synchronization message containing first information about a time of the higher-ranking time sync master;

accepting, by the clock sync master, a time of the higher-ranking time sync master as a system time of the clock sync master, performing time coordination of the plurality of sync slaves by the timing clock of the subordinate domain of the automation network and a difference between the operating clock of the subordinate domain of the automation network and the timing clock of the subordinate domain of the automation network if the system time of the clock sync master is identical to the timing clock of the subordinate domain of the automation network;

synchronizing the plurality of sync slaves by the clock sync master with respect to the operating clock of the subordinate domain of the automation network, a single domain-internal synchronization message serving to synchronize the plurality of sync slaves with respect to an operating clock and timing clock of each of the plurality of sync slaves of the automation network;

notifying the difference between the timing clock of the subordinate domain of the automation network and the operating clock of the subordinate domain of the automation network using the single domain-internal synchronization message;

accepting the difference between the timing clock of the subordinate domain of the automation network and the operating clock of the subordinate domain of the automation network using the single domain-internal synchronization message as additional information into the single domain-internal synchronization message;

informing a first sync slave of the plurality of sync slaves about the operating clock of the subordinate domain of the automation network and the difference between the timing clock of the subordinate domain of the automation network and the operating clock of the subordinate domain of the automation network by the single domain-internal synchronization message from the clock sync master; and transferring the information about the operating clock of the subordinate domain of the automation network and the difference between the timing clock of the subordinate domain of the automation network and the operating clock of the subordinate domain of the automation network to a next sync slave of each of the plurality of sync slaves by the single domain-internal synchronization message from a respective preceding sync slave of the sync slaves;

wherein the information supplied in the single domain-internal synchronization message about the operating clock of the subordinate domain of the automation network determines a respective operating clock of the plurality of sync slaves;

wherein each respective operating clock of the plurality of sync slaves is representable as a system-intrinsic operating clock of each of the plurality of sync slaves; and wherein the subordinate domain is retained unchanged for an integration of the subordinate domain into a higher-ranking domain.

2. The method as claimed in claim 1, wherein the timing clock of the subordinate domain of the automation network is directly synchronized with the timing clock of the higher-ranking domain to integrate the subordinate domain into the higher-ranking domain.

3. The method as claimed in claim 1, wherein the operating clock of the subordinate domain of the automation network and the timing clock of the subordinate domain of the automation network are provided by absolute time specifications.

4. The method as claimed in claim 3, wherein each individual sync slave of the subordinate domain is configured to read out the difference contained in the domain-internal synchronization message and calculate its local system time from this difference.

5. The method as claimed in claim 1, further comprising:
calculating a timing clock of the time sync master from the operating clock of the subordinate domain of the automation network, the difference between the operating clock of the subordinate domain of the automation network and the timing clock of the subordinate domain of the automation network, and the calculated timing clock to synchronize the timing clock of the subordinate domain of the automation network between the subordinate domain and a further subordinate domain; and
transmitting the time clock of the time sync master in a further synchronization message to the further subordinate domain to transition from the subordinate domain into the further subordinate domain at least one of without the difference and with the difference set to zero by a last sync slave of the plurality of sync slaves of the subordinate domain.

6. The method as claimed in claim 3, further comprising:
adapting a frequency of the clock sync master to a frequency of the time sync master;
setting a rate compensation between the time of the time sync master of the subordinate domain and a local system time of the clock sync master of the subordinate domain equal to 0, so that a clock error between the clock sync master and the time sync master is minimized.

7. The method as claimed in claim 1, wherein the domain-internal synchronization message has the operating clock of the subordinate domain of the automation network as its only clock.

8. A non-transitory computer program product encoded with a computer program which, when executed on a processor of an automation network, causes the processor to synchronize an operating clock of a subordinate domain of the automation network with a timing clock of the subordinate domain of the automation network, the automation network comprising a plurality of sync slaves of the subordinate domain, such that the plurality of sync slaves are coordinated in time, wherein a higher-ranking time sync master of a higher-ranking domain synchronizes each of the plurality of sync slaves of the subordinate domain with respect to the timing clock of the subordinate domain of the automation network, the computer program comprising:
program code for sending, from the higher-ranking time sync master, a first synchronization message to a clock sync master of the subordinate domain, the first synchronization message containing first information about a time of the higher-ranking time sync master;
program code for accepting, by the clock sync master, the time of the higher-ranking time sync master as a system time of the clock sync master;
program code for performing time coordination of the plurality of sync slaves by the timing clock of the subordinate domain of the automation network and a difference between the operating clock of the subordinate domain of the automation network and the timing clock of the subordinate domain of the automation network if the system time of the clock sync master is identical to the timing clock of the subordinate domain of the automation network;
program code for synchronizing the plurality of sync slaves by the clock sync master with respect to the operating clock of the subordinate domain of the automation network, a single domain-internal synchronization message serving to synchronize the plurality of sync slaves with respect to an operating clock and timing clock of each of the plurality of sync slaves of the automation network;
program code for notifying a difference between the timing clock of the subordinate domain of the automation network and the operating clock of the subordinate domain of the automation network using the single domain-internal synchronization message;
program code for accepting the difference between the timing clock of the subordinate domain of the automation network and the operating clock of the subordinate domain of the automation network using the single domain-internal synchronization message as additional information into the single domain-internal synchronization message;
program code for informing a first sync slave of the plurality of sync slaves about the operating clock of the subordinate domain of the automation network and the difference between the timing clock of the subordinate domain of the automation network and the operating clock of the subordinate domain of the automation network by the single domain-internal synchronization message from the clock sync master; and
program code for transferring the information about the operating clock of the subordinate domain of the automation network and the difference between the timing clock of the subordinate domain of the automation network and the operating clock of the subordinate domain of the automation network to a next sync slave of each of the plurality of sync slaves by the single domain-internal synchronization message from a respective preceding sync slave of the plurality of sync slaves;
wherein the information supplied in the single domain-internal synchronization message about the operating clock determines a respective operating clock of the plurality of sync slaves;
wherein each respective operating clock of the plurality of sync slaves is representable as a system-intrinsic operating clock of each of the plurality of sync slaves; and
wherein, for an integration of the subordinate domain into the higher-ranking domain, the subordinate domain is retained unchanged.

9. A facility for synchronizing an operating clock of a subordinate domain of an automation network with a timing clock of subordinate domain of the automation network, the automation network comprising a plurality of sync slaves of the subordinate domain, such that the plurality of sync slaves are coordinated in time, the facility comprising:
a higher-ranking time sync master of a higher-ranking domain configured to synchronize the plurality of sync slaves of the subordinate domain with respect to the timing clock of the subordinate domain of the automation network, the higher-ranking time sync master being configured to send a first synchronization message to a clock sync master of the subordinate domain, the first synchronization message containing first information about a time of the higher-ranking time sync master, the clock sync master being configured to accept the time of the higher-ranking time sync master as a system time of the clock sync master, the timing clock of the subordinate domain of the automation network being configured to, together with a difference between the timing clock of the subordinate domain of the automation network and the operating clock of the subordinate domain of the automation network, undertake timing coordination of the clock sync master of each of the plurality of sync slaves if the system time is identical to timing clock of the subordinate domain of the automation network, and the plurality of sync slaves being configured to be synchronized by the clock sync master with respect to the operating clock of the subordinate domain of the automation network;

a module for notification of the difference between the timing clock of the subordinate domain of the automation network and the operating clock of the subordinate domain of the automation network using only a single domain-internal synchronization message, the single domain-internal synchronization message serving to synchronize each of the plurality of sync slaves with respect to an operating clock of the subordinate domain of the automation network, the difference between the timing clock of the subordinate domain of the automation network and the operating clock of the subordinate domain of the automation network being contained as additional information in the domain-internal synchronization message, the clock sync master being configured to inform a first sync slave of the plurality of sync slaves about the operating clock of the subordinate domain of the automation network and the difference between the timing clock of the subordinate domain of the automation network and the operating clock of the subordinate domain of the automation network by the single domain-internal synchronization message, and a respective preceding sync slave of each of the plurality of sync slaves being configured to transfer the information about the operating clock of the subordinate domain of the automation network and the difference between the timing clock of the subordinate domain of the automation network and the operating clock of the subordinate domain of the automation network to a next sync slave of the plurality of sync slaves by the single domain-internal synchronization message;

wherein the information provided in the individual domain-internal synchronization message about the operating clock of the subordinate domain of the automation network is configured to determine an operating clock of each of the plurality of sync slave;

wherein the operating clock of each of the plurality of sync slaves is presentable as a system-intrinsic operating clock of the plurality of sync slaves; and wherein the operating clock of the subordinate domain is retained unchanged for an integration of the subordinate domain into the higher-ranking domain.

* * * * *